(12) United States Patent
Shin

(10) Patent No.: US 9,580,055 B2
(45) Date of Patent: Feb. 28, 2017

(54) PARKING BRAKE APPARATUS AND CONTROL METHOD THEREOF

(71) Applicant: HYUNDAI MOBIS CO., LTD., Seoul (KR)

(72) Inventor: Choong Sik Shin, Suwon-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 14/583,510

(22) Filed: Dec. 26, 2014

(65) Prior Publication Data

US 2015/0330465 A1    Nov. 19, 2015

(30) Foreign Application Priority Data

May 16, 2014    (KR) ........................ 10-2014-0058795

(51) Int. Cl.
| | | |
|---|---|---|
| *F16D 65/14* | (2006.01) | |
| *B60T 11/04* | (2006.01) | |
| *F16D 65/16* | (2006.01) | |
| *B60T 13/74* | (2006.01) | |
| *F16D 51/00* | (2006.01) | |
| F16D 65/00 | (2006.01) | |
| F16D 125/60 | (2012.01) | |
| F16D 125/62 | (2012.01) | |
| F16D 121/24 | (2012.01) | |
| F16D 125/40 | (2012.01) | |
| F16D 125/52 | (2012.01) | |

(52) U.S. Cl.
CPC ........... *B60T 11/046* (2013.01); *B60T 13/741* (2013.01); *F16D 51/00* (2013.01); *F16D 65/16* (2013.01); *F16D 2121/24* (2013.01); *F16D 2125/40* (2013.01); *F16D 2125/52* (2013.01); *F16D 2125/60* (2013.01); *F16D 2125/62* (2013.01)

(58) Field of Classification Search
CPC .... B60T 11/046; B60T 13/746; B60T 13/741; F16D 2121/24; F16D 2125/20; F16D 2125/40; F16D 2125/60; F16D 2125/62; F16D 2125/582; F16D 2125/52; F16D 65/16; F16D 51/00
USPC .. 188/2 D, 156, 157, 72.7, 72.8, 73.1, 106 F
See application file for complete search history.

(56) References Cited

U.S. PATENT DOCUMENTS

| | | | | |
|---|---|---|---|---|
| 5,590,744 A | * | 1/1997 | Belmond | ................ B60T 7/107 |
| | | | | 188/2 D |
| 8,051,956 B2 | * | 11/2011 | Huang | .................. B60T 11/046 |
| | | | | 188/158 |

(Continued)

FOREIGN PATENT DOCUMENTS

KR    10-2009-0039056 A    4/2009

*Primary Examiner* — Melody Burch
(74) *Attorney, Agent, or Firm* — Knobbe Martens Olson & Bear LLP

(57) ABSTRACT

A parking brake apparatus may include: a motor unit; a driving unit operated by the motor unit; a nut screw rotated by the driving unit; a bolt screw coupled to the nut screw so as to pass through the nut screw, and moved in a longitudinal direction inside the nut screw in connection with the rotation of the nut screw; a cable having one side connected to the bolt screw; a hook part connected to the other side of the cable; and a boot part having an internal space in which the cable and the hook part are moved in the longitudinal direction, and including a stopper arranged on a moving path of the hook part so as to restrict the movement of the hook part.

19 Claims, 13 Drawing Sheets

(56) References Cited

U.S. PATENT DOCUMENTS

| | | | |
|---|---|---|---|
| 8,210,326 B2* | 7/2012 | Kim | B60T 11/046 |
| | | | 188/156 |
| 2005/0189183 A1* | 9/2005 | Gil | B60T 7/107 |
| | | | 188/2 D |
| 2006/0289248 A1* | 12/2006 | Noh | B60T 13/746 |
| | | | 188/2 D |
| 2009/0247364 A1* | 10/2009 | Sano | B60T 13/746 |
| | | | 477/197 |
| 2011/0278114 A1* | 11/2011 | Lee | B60T 13/746 |
| | | | 188/156 |

* cited by examiner

PARKING BRAKE APPARATUS AND CONTROL METHOD THEREOF

CROSS-REFERENCES TO RELATED APPLICATIONS

The present application claims priority to Korean application number 10-2014-0058795, filed on May 16, 2014, which is incorporated by reference in its entirety.

BACKGROUND

The present disclosure relates to a parking brake apparatus and a control method thereof, and more particular, to a parking brake apparatus which is capable of preventing a bolt screw and a nut screw from being excessively tightened to each other, and a control method thereof.

In general, a parking brake apparatus is used in order to prevent the movement of a parked vehicle. An electronic parking brake (EPB) converts a rotational motion of a motor unit into a linear motion and transmits a braking force to a wheel.

The related art of the present invention is disclosed in Korean Patent Laid-open Publication No. 2009-0039056 published on Apr. 22, 2009 and entitled "Electronic parking brake system in vehicle".

SUMMARY

Embodiments of the present invention are directed to a parking brake apparatus capable of preventing a bolt screw and a nut screw from being excessively tightened to each other, and a control method thereof.

Also, embodiments of the present invention are directed to a parking brake apparatus capable of preventing a situation in which it is impossible to loosen the coupling between a bolt screw and a nut screw, and a control method thereof.

Also, embodiments of the present invention are directed to a parking brake apparatus capable of preventing a worm gear from being damaged by an impact applied to the worm gear to rotate a nut screw, and a control method thereof.

Also, embodiments of the present invention are directed to a parking brake apparatus capable of preventing a collision between a hook part and a guide pipe, a collision between a cable connection part and a nut screw, and a collision between a bolt screw and a bolt screw housing part, and a control method thereof.

In one embodiment, a parking brake apparatus may include: a motor unit; a driving unit operated by the motor unit; a nut screw rotated by the driving unit; a bolt screw coupled to the nut screw so as to pass through the nut screw, and moved in a longitudinal direction inside the nut screw in connection with the rotation of the nut screw; a cable having one side connected to the bolt screw; a hook part connected to the other side of the cable; and a boot part having an internal space in which the cable and the hook part are moved in the longitudinal direction, and including a stopper arranged on a moving path of the hook part so as to restrict the movement of the hook part.

The parking brake apparatus may further include a cable connection part arranged between the bolt screw and the cable so as to connect the bolt screw and the cable.

The parking brake apparatus may further include a guide pipe having an internal space in which the cable connection part is moved, and guiding a moving path of the cable connection part such that the cable is moved on the same axis as the bolt screw.

The guide pipe may include a pipe body formed in a hollow cylindrical shape, and having a guide groove formed on an inner surface thereof, the cable connection part may have a pin formed on an outer surface thereof so as to protrude outward, and the pin may be inserted into the guide groove, and moved along the guide groove when the cable connection part is moved.

The guide pipe may have an elastic member installed therein so as to block a collision between the cable connection part and the guide pipe.

The guide pipe may have a stopper installed at an inner surface thereof adjacent to the nut screw, and the stopper may be arranged on the moving path of the cable connection part so as to restrict the movement of the cable connection part.

The parking brake apparatus may further include an electronic control unit (ECU) configured to control the operation of the motor unit when the cable connection part comes in contact with the stopper.

The stopper may include a sensor configured to sense whether the cable connection part comes in contact with the stopper, and the ECU may stop the operation of the motor unit based on a contact signal transmitted from the sensor.

The parking brake apparatus may further include an ECU configured to control the operation of the motor unit when the hook part comes in contact with the stopper.

The stopper may include a sensor configured to sense whether the hook part comes in contact with the stopper, and the ECU may stop the operation of the motor unit based on a contact signal transmitted from the sensor.

The parking brake apparatus may further include a housing surrounding the bolt screw and having a stopper installed on an inner surface thereof. The stopper may be arranged on a moving path of the bolt screw so as to restrict the movement of the bolt screw.

The parking brake apparatus may further include an ECU configured to control the operation of the motor unit when the bolt screw comes in contact with the stopper.

The stopper may include a sensor configured to sense whether the bolt screw comes in contact with the stopper, and the ECU may stop the operation of the motor unit based on a contact signal transmitted from the sensor.

In another embodiment, a parking brake apparatus may include: a motor unit; a driving unit operated by the motor unit; a nut screw rotated by the driving unit; a bolt screw coupled to the nut screw so as to pass through the nut screw, and moved in a longitudinal direction inside the nut screw in connection with the rotation of the nut screw; a cable connection part having one side coupled to the bolt screw; a cable coupled to the other part of the cable connection part; and a guide pipe having an internal space in which the cable connection part is moved, and guiding a moving path of the cable connection part. The guide pipe may have a stopper installed at an inner surface thereof adjacent to the nut screw, and the stopper may be arranged on the moving path of the cable connection part so as to restrict the movement of the cable connection part.

The parking brake apparatus may further include an ECU configured to control the operation of the motor unit when the cable connection part comes in contact with the stopper.

The stopper may include a sensor configured to sense whether the cable connection part comes in contact with the stopper, and the ECU may stop the operation of the motor unit based on a contact signal transmitted from the sensor.

In another embodiment, a parking brake apparatus may include: a motor unit; a driving unit operated by the motor unit; a nut screw rotated by the driving unit; a bolt screw coupled to the nut screw so as to pass through the nut screw, and moved in a longitudinal direction inside the nut screw in connection with the rotation of the nut screw; a cable connection part having one side coupled to the bolt screw; a cable coupled to the other side of the cable connection part; and a housing surrounding the bolt screw, and having a stopper installed on an inner surface thereof. The stopper may be arranged on a moving path of the bolt screw so as to restrict the movement of the bolt screw.

The parking brake apparatus may further include an ECU configured to control the operation of the motor unit when the bolt screw comes in contact with the stopper.

The stopper may include a sensor configured to sense whether the bolt screw comes in contact with the stopper, and the ECU may stop the operation of the motor unit based on a contact signal transmitted from the sensor.

In another embodiment, a control method of a parking brake apparatus may include: driving a motor unit; operating a driving unit connected to the motor unit through the operation of the motor unit; rotating a nut screw connected to the driving unit through the operation of the driving unit; moving a bolt screw coupled to the nut screw through the rotation of the nut screw; moving a cable connected to the bolt screw in the same direction through the movement of the bolt screw; moving a hook part connected to the cable through the movement of the cable such that the hook part comes in contact with the stopper; and stopping, by an ECU, the operation of the motor unit when the contact between the hook part and the stopper is sensed.

In another embodiment, a control method of a parking brake apparatus may include: driving a motor unit; operating a driving unit connected to the motor unit through the operation of the motor unit; rotating a nut screw connected to the driving unit through the operation of the driving unit; moving a bolt screw coupled to the nut screw through the rotation of the nut screw; moving a cable connected to the bolt screw in the same direction through the movement of the bolt screw; moving a hook part connected to the cable toward a stopper through the movement of the cable; sensing whether the hook part comes in contact with the stopper, through a sensor; and stopping, by an ECU, the operation of the motor unit when receiving a contact signal between the hook part and the stopper from the sensor.

DESCRIPTION OF SPECIFIC EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

In an EPB, when a driver manipulates a button, switch, or lever to drive the motor unit, the motor unit is rotated to move a bolt screw and a nut screw, and a cable connected to the bolt screw and the nut screw is pulled to generate a braking force. In the parking brake apparatus, the length of the cable is changed due to the increase in number of operations, lining wear or the like. Then, during operation of the parking brake, the moving distance of the cable increases. Thus, when the bolt screw and the nut screw are excessively tightened to each other, the coupling between the bolt screw and the nut screw may not be released. Then, a braking force generated from the parking brake apparatus may be not released. Furthermore, an impact may be applied to a worm gear and a helical gear in a state where the bolt screw and the nut screw are tightened to each other, thereby damaging a gear.

Figure 1:
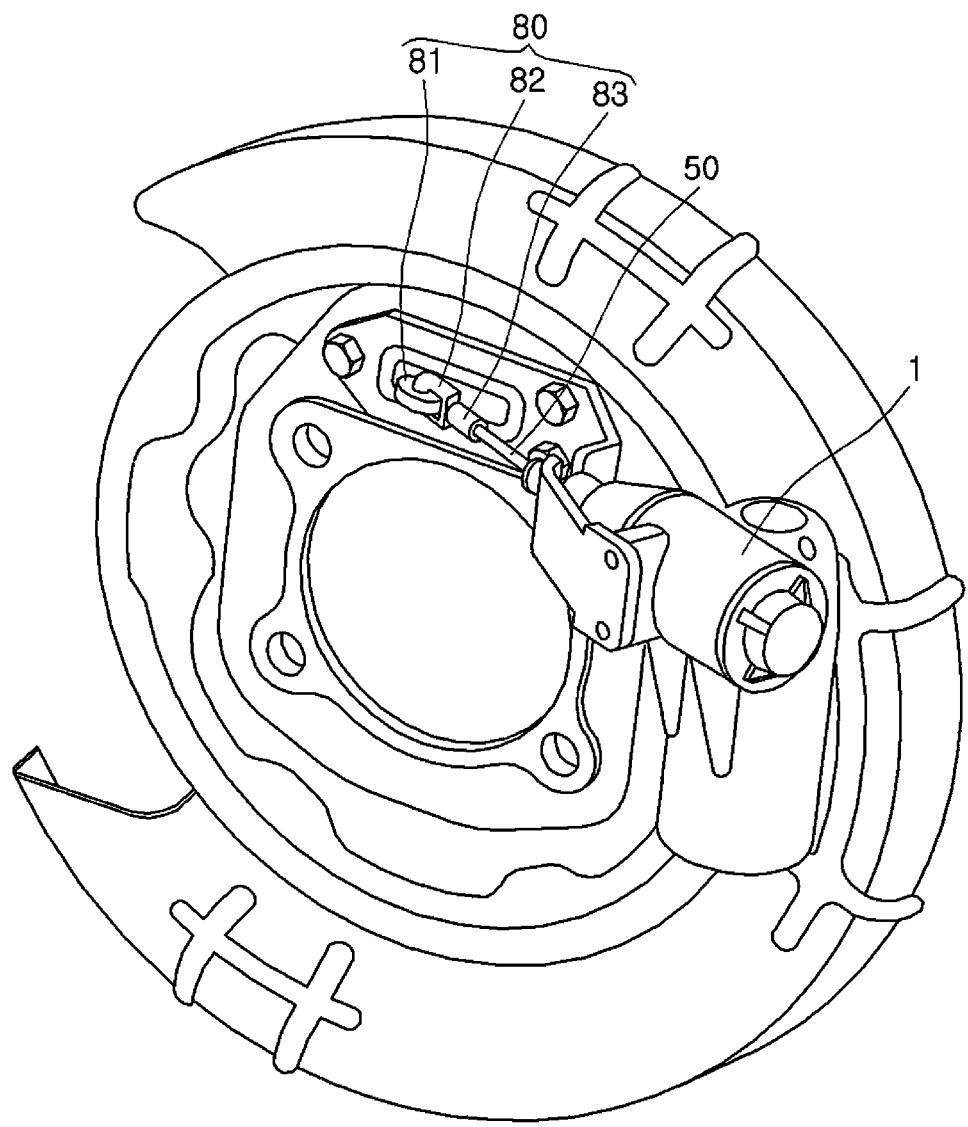
FIG. 1 is a schematic perspective view of a parking brake apparatus in accordance with an embodiment of the present invention.
Figure 2:
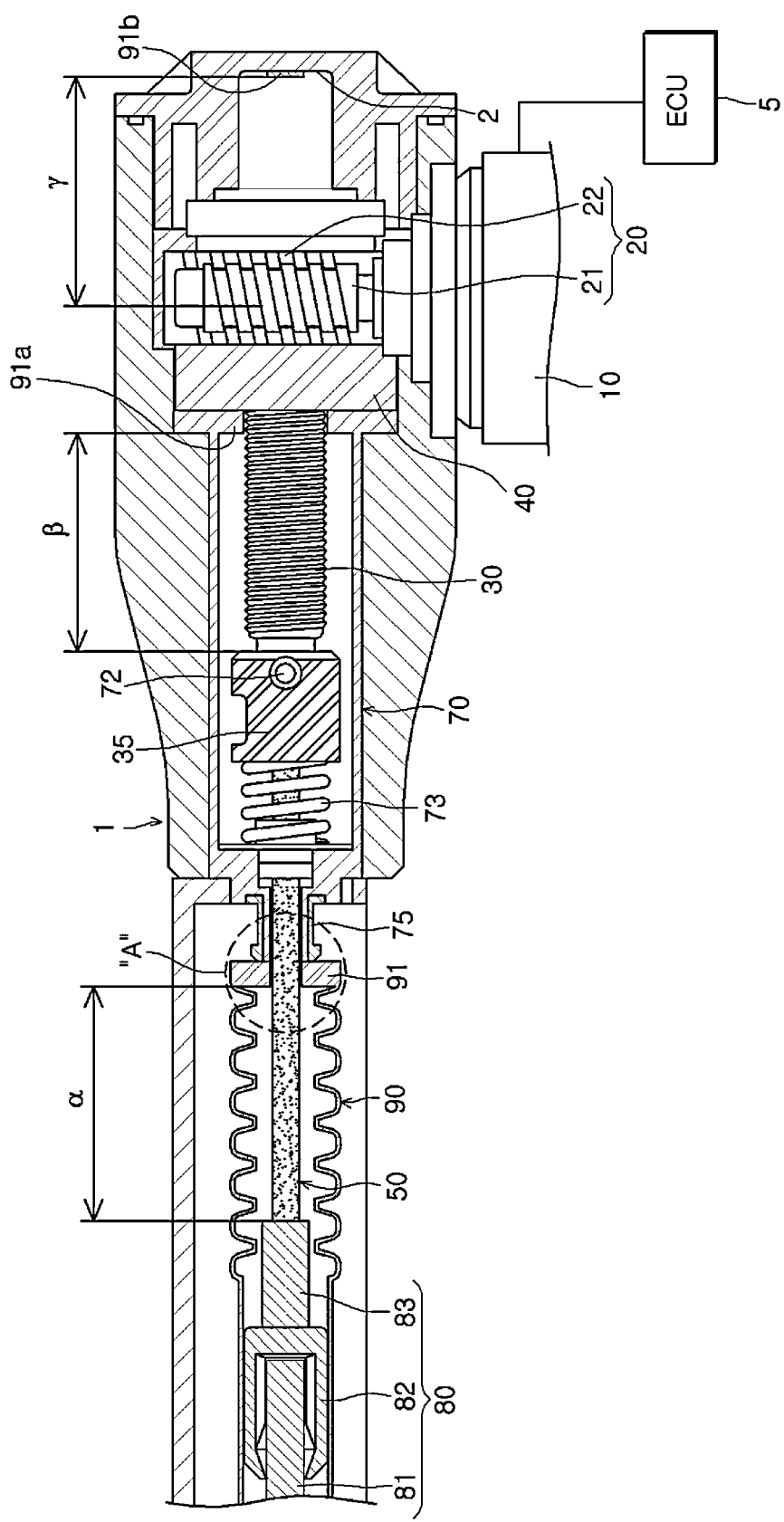
FIG. 2 is a schematic cross-sectional view of the parking brake apparatus in accordance with the embodiment of the present invention.
Figure 3:
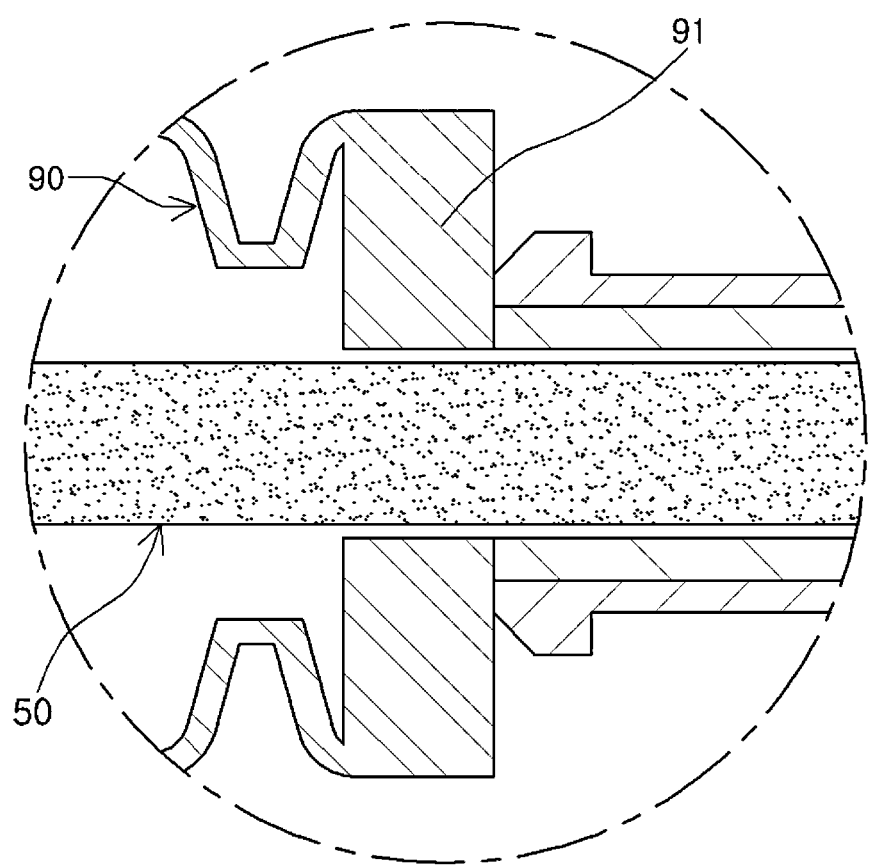
FIG. 3 is an expanded view of a portion A in FIG. 2.
Figure 4:
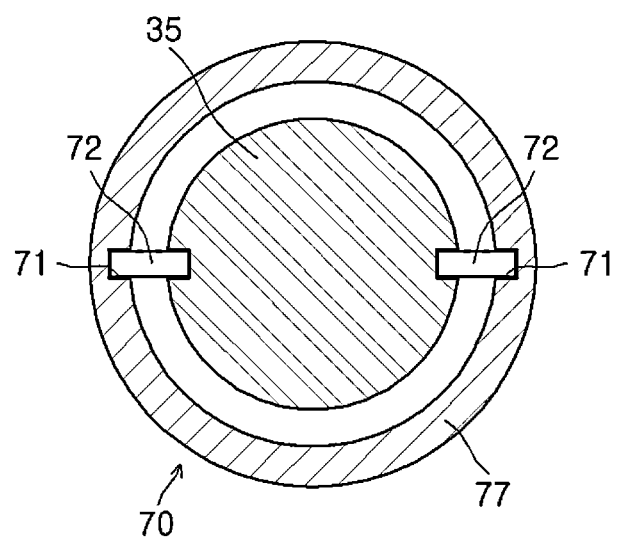
FIG. 4 is a schematic cross-sectional view of a guide pipe of the parking brake apparatus in accordance with the embodiment of the present invention.
Figure 5:
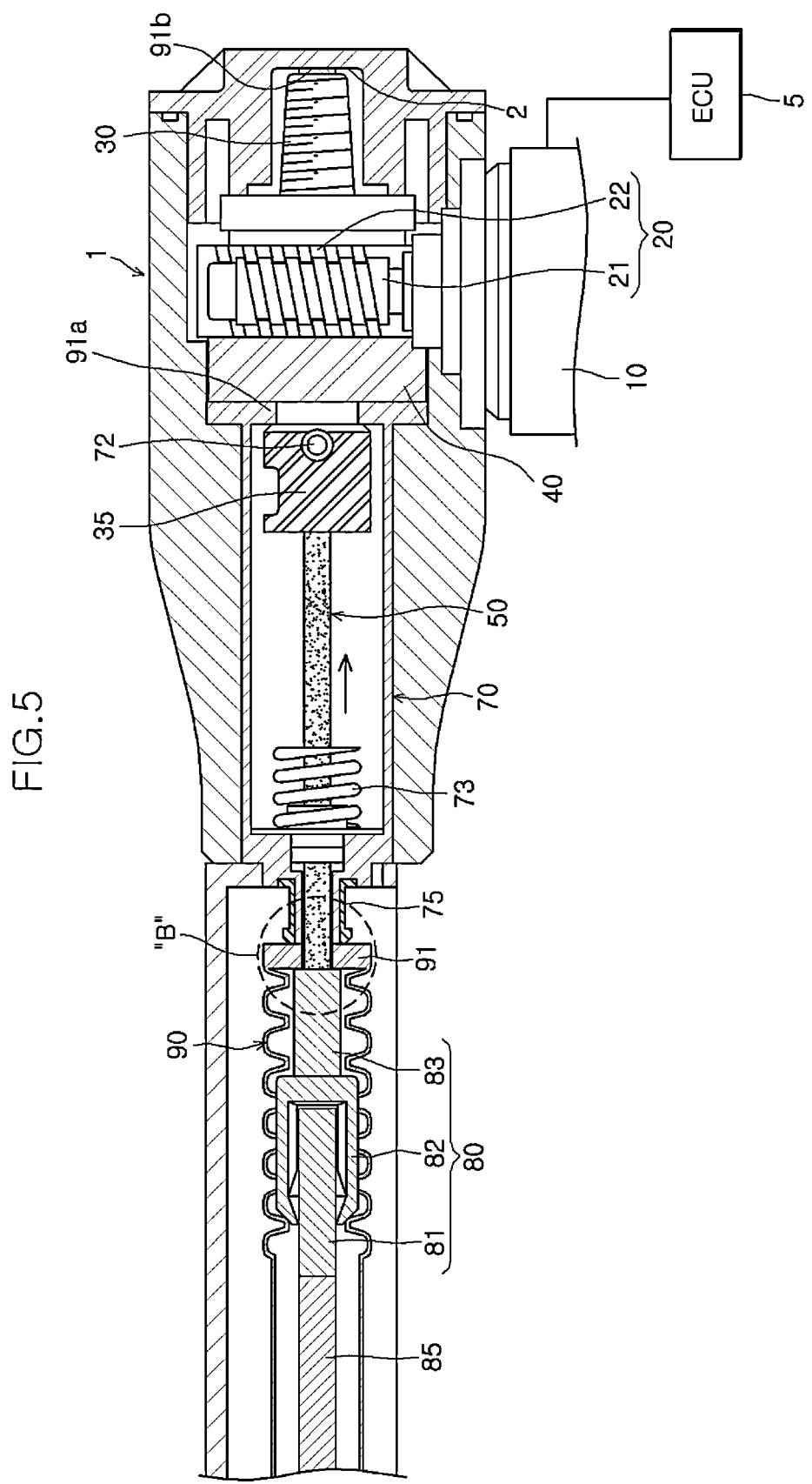
FIG. 5 is a schematic cross-sectional view illustrating an operation state of the parking brake apparatus in accordance with the embodiment of the present invention.
Figure 6:
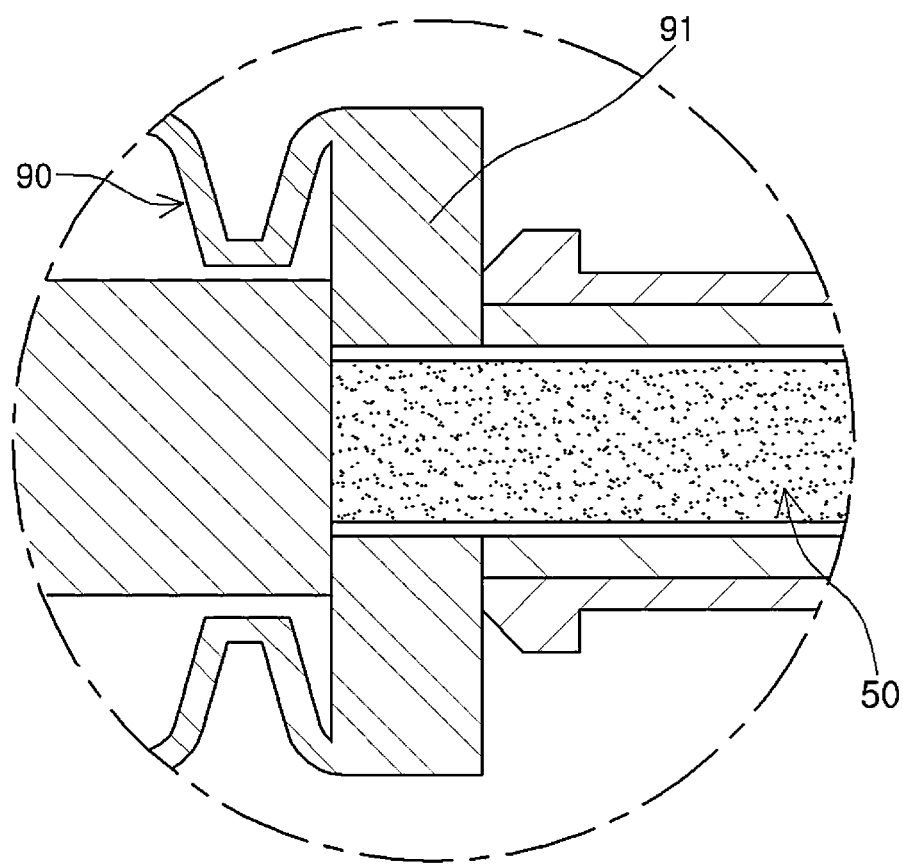
FIG. 6 is an expanded view of a portion B in FIG. 5.
Figure 7:
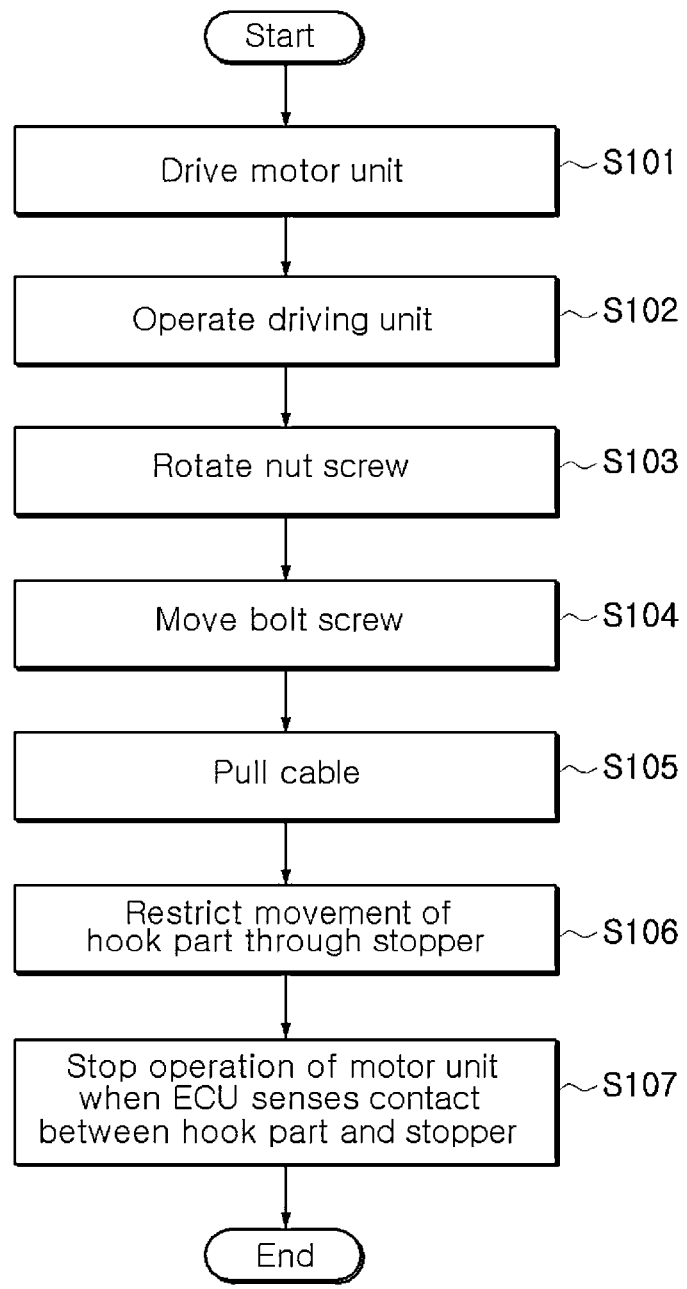
FIG. 7 is a flowchart illustrating the operation of the parking brake apparatus in accordance with the embodiment of the present invention.

FIG. 1 is a schematic perspective view of a parking brake apparatus in accordance with an embodiment of the present invention. FIG. 2 is a schematic cross-sectional view of the parking brake apparatus in accordance with the embodiment of the present invention. FIG. 3 is an expanded view of a portion A in FIG. 2. FIG. 4 is a schematic cross-sectional view of a guide pipe of the parking brake apparatus in accordance with the embodiment of the present invention. FIG. 5 is a schematic cross-sectional view illustrating an operation state of the parking brake apparatus in accordance with the embodiment of the present invention. FIG. 6 is an expanded view of a portion B in FIG. 5. FIG. 7 is a flowchart illustrating the operation of the parking brake apparatus in accordance with the embodiment of the present invention.

Referring to FIGS. 1 and 2, the parking brake apparatus in accordance with the embodiment of the present invention may include a motor unit 10, a driving unit 20, a bolt screw 30, a nut screw 40, a cable 50, a guide pipe 70, a hook part 80, and a boot part 90.

The housing 1 may have a space formed therein, and include a metallic material or synthetic resin. The housing 1 may prevent internal parts, such as the motor unit 10, the driving unit 20, the bolt screw 30, the nut screw 40, the cable 50, the guide pipe 70, and the boot part 90, from being damaged by an external impact, or prevent the internal parts from being contaminated by foreign matters introduced from outside. The cable 50 may be connected to the hook part 80 through the housing 1.

The motor unit 10 may be controlled by an ECU (Electronic Control Unit) 5. The motor unit 10 may convert electrical energy applied from outside into rotational energy. The rotational energy generated by the motor unit 10 may be transmitted to the driving unit 20 so as to rotate the driving unit 20 in a state where the rotation speed thereof is controlled.

The driving unit 20 may be operated by power transmitted by the motor unit 10. In the present embodiment, the driving unit 20 may include a worm gear 21 and a helical gear 22. The worm gear 21 may be directly coaxially-connected to the motor unit 10 and rotated by the operation of the motor unit 10. The helical gear 22 may be rotated in a state where it is engaged with the worm gear 21, and convert the rotational direction of the worm gear 21 into the orthogonal direction. The helical gear 22 may be connected to the bolt screw 30, and axially rotate the bolt screw 30. The housing 1 may include a bearing to support the outer circumferential surface of the nut screw 40.

Since the driving unit 20 includes the worm gear 21 and the helical gear 22, the driving unit 20 may convert a rotational motion of the motor unit 10 into a linear motion, and the installation space of the driving unit 20 may be reduced.

The nut screw 40 may be connected to the helical gear 22 of the driving unit 20, and rotated by the rotation of the helical gear 22. The bolt screw 30 may be arranged through the nut screw 40 and moved inside the nut screw 40.

The bolt screw 30 may have a plurality of screw threads formed on the outer circumferential surface thereof, and the bolt screw 30 and the nut screw 40 may be coupled to each other through a screw thread formed on the inner surface of the nut screw 40. The bolt screw 30 may be reciprocated in the side-to-side direction in FIG. 2 while the coupling between the bolt screw 30 and the nut screw 40 are tightened or loosened. The bolt screw 30 may be reciprocated in a longitudinal direction (side-to-side direction in FIG. 2) inside the guide pipe 70, while being rotated by the nut screw 40 which is connected to the helical gear 22 of the driving unit 20. The bolt screw 30 may have a cable coupler or cable connection part 35 formed at one end thereof (left end in FIG, 2). The cable connection part 35 may be connected to the cable 50. The cable 50 may be pulled to the right by the cable connection part 35 as the bolt screw 30 is moved to the right.

One end (right end in FIG. 2) of the cable 50 may be connected to the cable connection part 35, and the other end (left end in FIG. 2) of the cable 50 may be connected to a hook guide 83 of the hook part 80. The cable 50 may be moved between the boot part 90 and the guide pipe 70 by the operation of the cable connection part 35.

One surface (left surface in FIG. 2) of the guide pipe 70 may be opened so that the cable 50 passes through the guide pipe 70, and the guide pipe 70 may have an internal space in which the bolt screw 30 is installed to move in the longitudinal direction. At the open surface (left surface in FIG. 2) of the guide pipe 70, a guide part 75 having a predetermined length may be formed to support the cable 50. The guide pipe 70 may guide the moving path of the cable connection part 35 such that the cable 50 is moved on the same axis as the bolt screw 30.

The guide pipe 70 may additionally include a stopper 91a installed at the inner surface adjacent to the nut screw 40. At this time, since the stopper 91a is arranged on the moving path of the cable connection part 35, the stopper 91a may restrict the movement of the cable connection part 35. That is, when a driving force is provided, the cable connection part 35 may be freely moved to the position where the stopper 91a is installed. However, when the cable connection part 35 comes in contact with the stopper 91a, the movement of the cable connection part 35 may be stopped by the stopper 91a. Thus, since the movement of the cable connection part 35 is restricted before the cable connection part 35 collides with the nut screw 40, the cable connection part 35 and the nut screw 40 may be prevented from being damaged by a collision.

Referring to FIG. 4, the guide pipe 70 may include a pipe body 77 and a guide groove 71. The pipe body 77 may have a hollow cylindrical shape, and form the body of the guide pipe 70. The guide groove 71 may be formed to a predetermined depth at both sides of the inner circumferential surface of the pipe body 77 along the longitudinal direction. The cable connection part 35 may have a pin 72 formed at both sides thereof so as to protrude to the outside, and the protruding pin 72 may be arranged to move along the guide groove 71. Thus, as the pin 72 is moved along the guide groove 71, the cable connection part 35 may not be rotated but reciprocated in the guide pipe 70 along the longitudinal direction of the bolt screw 30. That is, as the moving path of the pin 72 is guided by the guide groove 71, the cable connection part 35 having the pin 72 installed thereon may be reciprocated in a state where the rotation thereof is restricted by the guide groove 71.

At one side (left side in FIG. 2) of the guide pipe 70, an elastic member 73 may be installed to prevent a collision between the guide pipe 70 and the cable connection part 35 which is reciprocated in the guide pipe 70. The elastic member 73 may be formed in a spring shape so as to prevent the reciprocated cable connection part 35 from colliding with the guide pipe 70, and buffer an impact transmitted to the guide pipe 70 when the cable connection part 35 is moved.

The hook part 80 may include a ring 81, a ring connection part 82, and a hook guide 83. The hook guide 83 may be installed at one end (right end in FIG. 2) of the ring connection part 82, and the other end (left end in FIG. 2) of the ring connection part 82 may be connected to the center of the ring 81. The ring connection part 82 may be formed to have a larger diameter than the inner diameter of the boot part 90 before the boot part 90 is elastically deformed.

The ring 81 may be connected to an operating lever 85 of a parking brake (not illustrated). When the cable 50 is pulled to the right, the ring connection part 82 may pull the ring 81 to the right. Then, the operating lever 85 may be operated to transmit a braking force to a wheel of the vehicle. The hook guide 83 may be formed to have a diameter correspond to the inner diameter of the boot part 90. When the cable 50 is pulled to the right, the hook guide 83 may be moved to the right along the internal space of the boot part 90.

The boot part 90 may have an internal space through which the cable 50 passes, include a plurality of creases formed on the outer surface thereof, and serve to block foreign matters or moisture from being introduced from outside. In the internal space of the boot part 90, the cable 50 and the hook part 80 may be moved in the longitudinal direction.

The boot part 90 may include a rubber material which can be elastically deformed. When the hook guide 83 passes through the boot part 90, the boot part 90 may be elastically deformed while the ring connection part 82 comes in contact with the boot part 90. After the ring connection part 82 passes through the boot part 90, the boot part 90 may be restored to the original shape. The boot part 90 may have a stopper 91 formed therein. When the hook guide 83 of the hook part 80 comes in contact with the stopper 91, the movement of the hook part 80 in the boot part 90 may be stopped by the stopper 91.

In FIG. 2, a symbol α represents an operating distance of the hook guide 83, β represents an operating distance of the cable connection part 35, and γ represents an operating distance of the bolt screw 30.

Referring to FIGS. 2 and 4, the distance α which the hook guide 83 is moved until it comes in contact with the stopper 91, the distance β which the cable connection part 35 is moved unit it comes contact with the stopper 91a formed around the nut screw 40, and the distance γ which the bolt screw 30 is moved until it comes in contact with a stopper 91b formed around a bolt screw housing part 2 formed at an end of the housing 1 may be set to be equal to each other. Thus, when the hook guide 83 comes in contact with the stopper 91, the cable connection part 35 may come in contact with the stopper 91a, and the bolt screw 30 may come in contact with the stopper 91b. Furthermore, when the hook guide 83, the cable connection part 35, and the bolt screw 30 come in contact with the stoppers 91, 91a, and 91b, respectively, the ECU 5 may recognize the contact and stop the operation of the motor unit 10, thereby stopping the operations of the respective components such as the driving unit 20, the nut screw 40, and the bolt screw 30.

The stopper 91b may be installed on the inner surface of the housing 1, or specifically the inner surface of the bolt screw housing part 2. At this time, since the stopper 91b is arranged on the moving path of the bolt screw 30, the stopper 91b may restrict the movement of the bolt screw 30. That is, when a driving force is provided, the bolt screw 30 may be freely moved to the position where the stopper 91b is installed. However, when the bolt screw 30 comes in contact with the stopper 91b, the movement of the bolt screw 30 may be restricted by the stopper 91b. Thus, since the stopper 91b restricts the movement of the bolt screw 30 before the bolt screw 30 collides with the inner wall of the bolt screw housing part 2, the stopper 91b may prevent the damage of the bolt screw 30 and the bolt screw housing part 2.

Due to the reason for design or assembly tolerance, α, β, and γ may be set to be different from each other. In this case, when any one of the hook guide 83, the cable connection part 35, and the bolt screw 30 comes in contact with the stopper 91, 91a, or 91b, the ECU 5 may recognize the contact and stop the operation of the motor unit 10, thereby stopping the operations of the respective components such as the driving unit 20, the nut screw 40, and the bolt screw 30.

Among the operating distance α of the hook guide 83, the operating distance β of the cable connection part 35, and the operating distance γ of the hook guide 83, the operating distance α of the hook guide 83 may be set to the smallest distance. In this case, when the hook guide 83 comes in contact with the stopper 91, the ECU 5 may stop the operation of the motor unit 10, thereby stopping the operations of the respective components such as the driving unit 20, the nut screw 40, and the bolt screw 30. As this time, before the cable connection part 35 comes in contact with the nut screw 40 or the bolt screw 30 comes in contact with the bolt screw housing part 2, the hook guide 83 comes in contact with the stopper 91. Thus, the damage of the cable connection part 35 or the bolt screw 30 can be prevented.

In another embodiment of the present invention, instead of the stopper 91, a spring may be installed in the boot part 90 so as to stop the movement of the hook guide 83.

Referring to FIGS. 3 and 6, when the nut screw 40 and the bolt screw 30 are operated by the operation of the driving unit 20, the cable 50 connected to the cable connection part 35 may be pulled to the right in FIG. 2, and the hook part 80 may be moved in the same direction as the cable 50. When the hook guide 83 is moved a predetermined distance in the boot part 90 and comes in contact with the stopper 91, the movement of the hook guide 83 inside the boot part 90 may be blocked by the stopper 91.

When the hook guide 83 pressurizes the stopper 91, the load of the motor unit 10 may be increased. At this time, when the current consumption of the motor unit 10 reaches a preset value as the load is increased, the ECU 5 may detect that the current consumption reaches the preset value, and then stop the operation of the motor unit 10. That is, the hook guide 83 to pressurize the stopper 91 may not be moved any more. At this time, when the force applied to the stopper 91 by the hook guide 83 reaches a preset value (for example, 120 kgf), the current consumption of the motor unit 10 may be increased. When the ECU 5 detects that the current consumption of the motor unit 10 reached the preset value, the ECU 5 may stop the operation of the motor unit 10. Then, the operations of the worm gear 21 and the helical gear 22 in the driving unit 20 and the operations of the nut screw 40 and the bolt screw 30 may be stopped to prevent the hook guide 83 from moving to the right.

As such, when the operation of the motor unit 10 is stopped at the time at which the operation of the motor unit 10 is not required any more, the bolt screw 30 and the nut screw 40 may be prevented from being excessively tightened to each other. Thus, it is possible to prevent the situation in which it is impossible to loosen the coupling between the bolt screw 30 and the nut screw 40 because the bolt screw 30 and the nut screw 40 were excessively tightened. Furthermore, the operation of loosening the coupling between the bolt screw 30 and the nut screw 40 may be more smoothly performed. This is because the hook guide 83 is stopped by the stopper 91 to stop the operations of the bolt screw 30 and the nut screw 40 before and the bolt screw 30 and the nut screw 40 are excessively tightened to each other.

Furthermore, since the motor unit 10 can be operated only in a necessary situation, unnecessary power consumption may be prevented. Furthermore, since the worm gear 21 and the helical gear 22 can be prevented from be excessively operated, it is possible to prevent an impact applied to the worm gear 21 and the helical gear 22 or the damage of the worm gear 21 and the helical gear 22, thereby extending the lifetime.

The operation after the cable connection part 35 comes in contact with the stopper 91a or the operation after the bolt screw 30 comes in contact with the stopper 91b may be performed in the same manner as the operation after the hook guide 83 comes in contact with the stopper 91. Thus, the descriptions of the operation after the cable connection part 35 comes in contact with the stopper 91a and the operation after the bolt screw 30 comes in contact with the stopper 91b are omitted herein.

Referring to FIG. 7, the operation of the parking brake apparatus in accordance with the embodiment of the present invention will be described as follows.

When a driver manipulates a button, switch, or lever to operate the parking brake apparatus, the ECU 5 may drive the motor unit 10 at step S101.

The driving unit 20 may be operated by a rotational force generated by the motor unit 10 at step S102. The rotational force of the motor unit 10 may be transmitted to the worm gear 21 of the driving unit 20. The worm gear 21 may rotate the helical gear 22, and the helical gear 22 may rotate the nut screw 40, at step S103. While the nut screw 40 is rotated, the bolt screw 30 coupled to the nut screw 40 may be moved to the right at step S104.

The cable 50 may also be moved to the right by the movement of the bolt screw 30. Since the bolt screw 30 is linearly moved to the right in the nut screw 40, the cable 50 may be pulled to the right through the cable connection part 35 connected to the bolt screw 30 at step S105. At this time, the hook guide 83 of the hook part 80 may be moved to the right along the inside of the boot part 90 by the cable 50.

When the hook guide 83 is moved to the right and comes in contact with the stopper 91 of the boot part 90, the hook guide 83 is not moved any more at step S106. That is, as the stopper 91 is arranged on the moving path of the hook guide 83, the movement of the hook guide 83 may be restricted by the stopper 91. During the contact between the cable connection part 35 and the stopper 91a or the contact between the bolt screw 30 and the stopper 91b in addition to the contact between the hook guide 83 and the stopper 91, the movement of the cable connection part 35 or the bolt screw 30 to the right may be restricted by the stopper 91a or 91b.

When the hook guide 83 pressurizes the stopper 91 at a force equal to or more than a preset value, the cable connection part 35 pressurizes the stopper 91a at a force equal to or more than the preset value, or the bolt screw 30 pressurizes the stopper 91b at a force equal to or more than the preset value, the ECU 5 may detect that the current consumption of the motor unit 10 is equal to or more than a present value. Then, the ECU 5 may stop the operation of the motor unit 10 at step S107.

As such, when the operation of the motor unit 10 is stopped at the time at which the operation of the motor unit 10 is not required any more, the bolt screw 30 and the nut screw 40 may be prevented from being excessively tightened to each other. Thus, it is possible to prevent a situation in which it is impossible to loosen the coupling between the bolt screw 30 and the nut screw 40. Therefore, it is possible to prevent a situation in which the braking force of the parking brake apparatus is not released because it is impossible to loosen the coupling between the bolt screw 30 and the nut screw 40.

Furthermore, the stopper 91 may prevent the hook guide 83 from colliding with the guide pipe 70, the stopper 91a may prevent the cable connection part 35 from colliding with the nut screw 40, and the stopper 91b may prevent the bolt screw 30 from colliding with the bolt screw housing part 2.

Hereafter, a parking brake apparatus in accordance with another embodiment of the present invention will be described.

Figure 8:
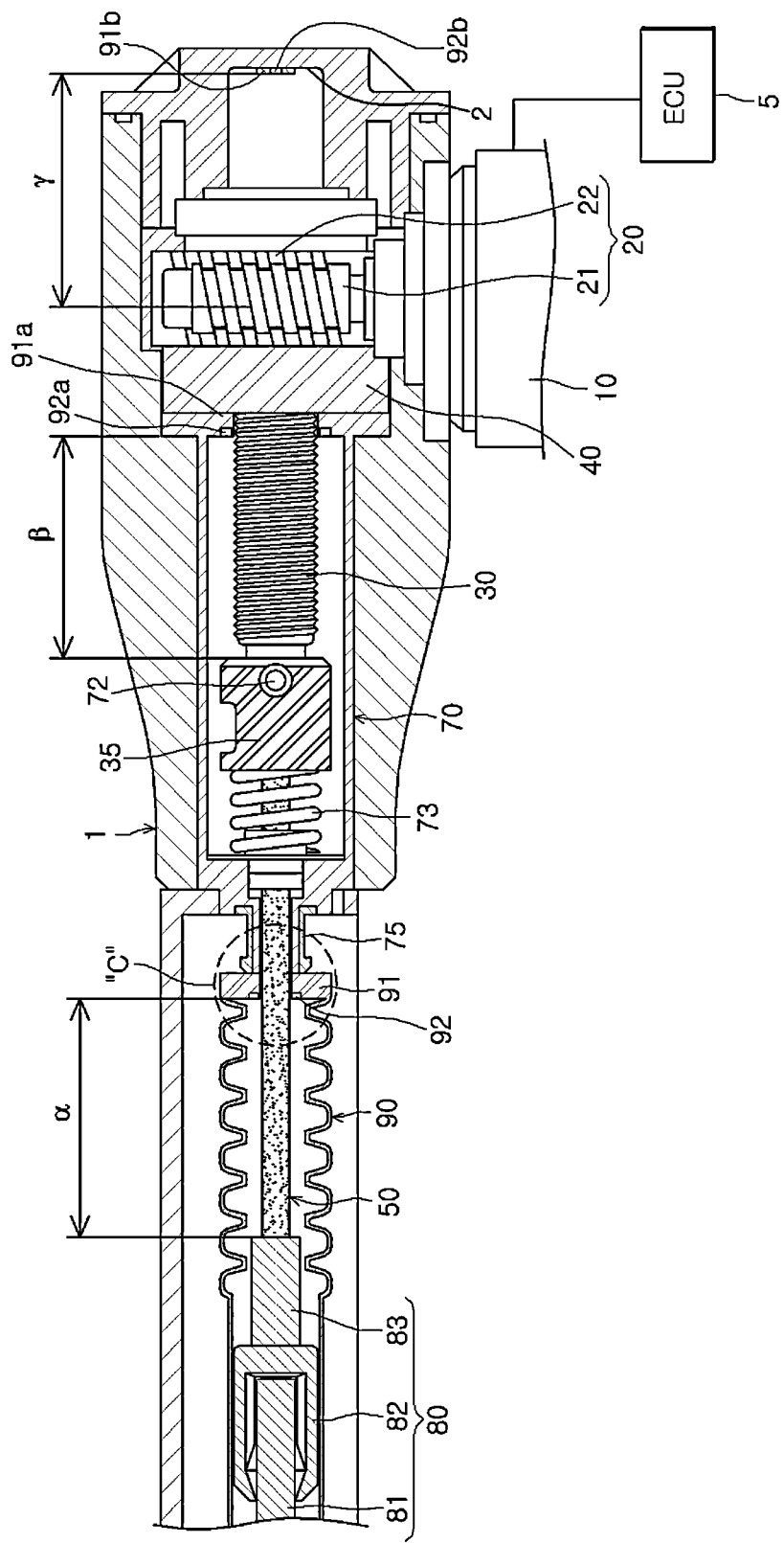
FIG. 8 is a schematic perspective view of a parking brake apparatus in accordance with another embodiment of the present invention.
Figure 9:
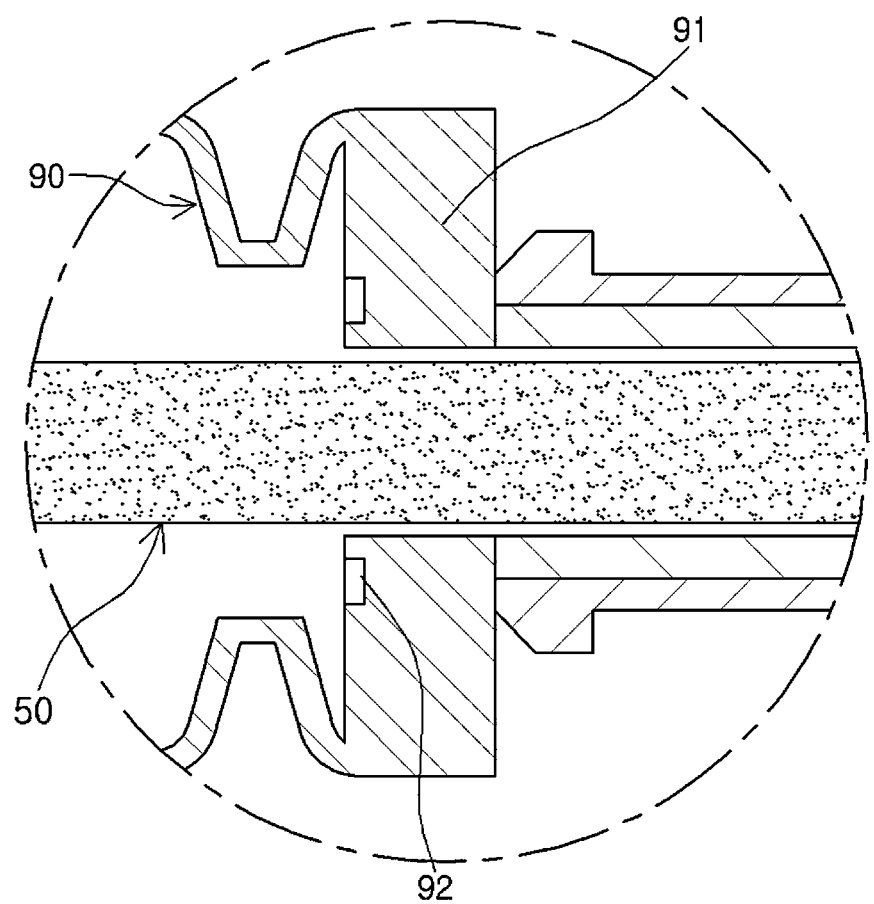
FIG. 9 is an expanded view of a portion C in FIG. 8.
Figure 10:
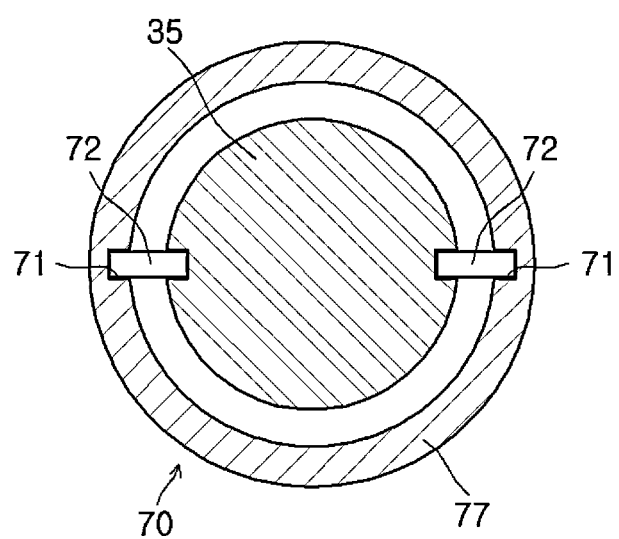
FIG. 10 is a schematic cross-sectional view of a guide pipe in the parking brake apparatus in accordance with the embodiment of the present invention.
Figure 11:
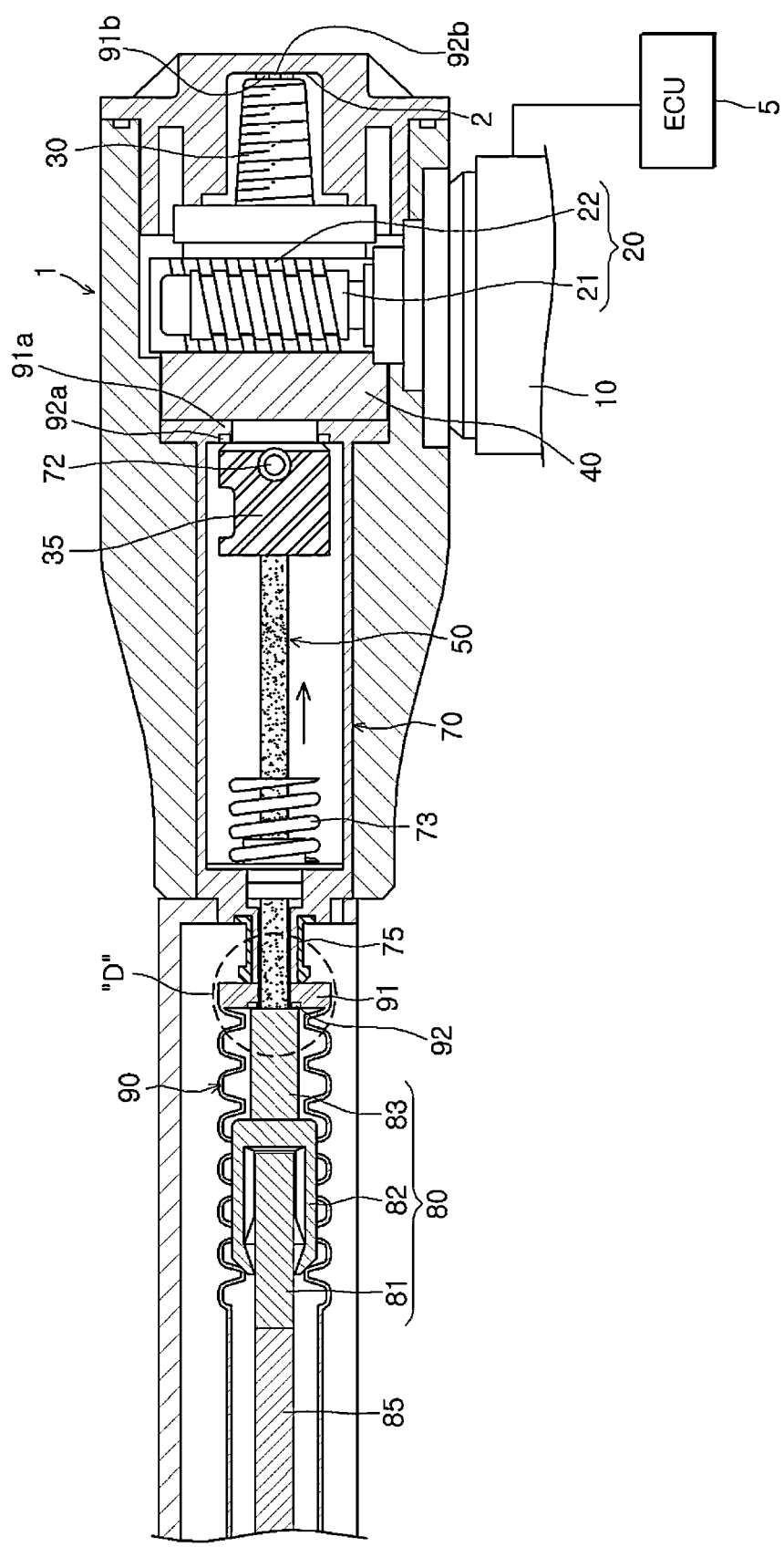
FIG. 11 is a schematic cross-sectional view illustrating an operation state of the parking brake apparatus in accordance with the embodiment of the present invention.
Figure 12:
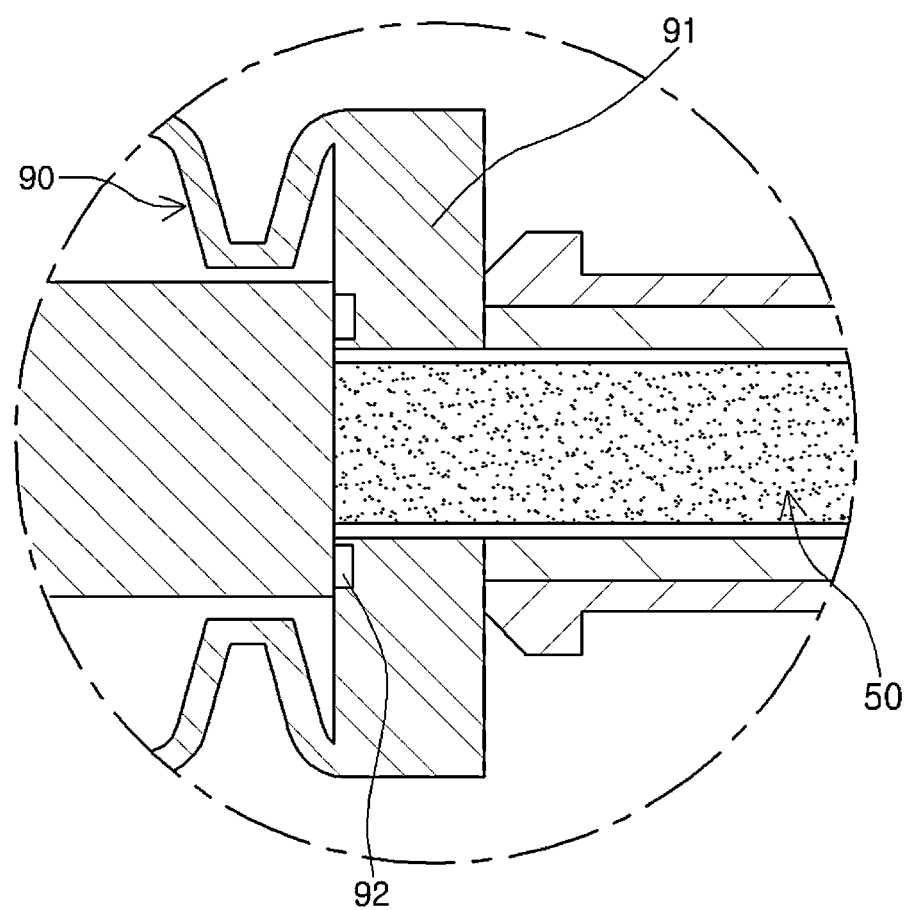
FIG. 12 is an expanded view of a portion D in FIG. 11.
Figure 13:
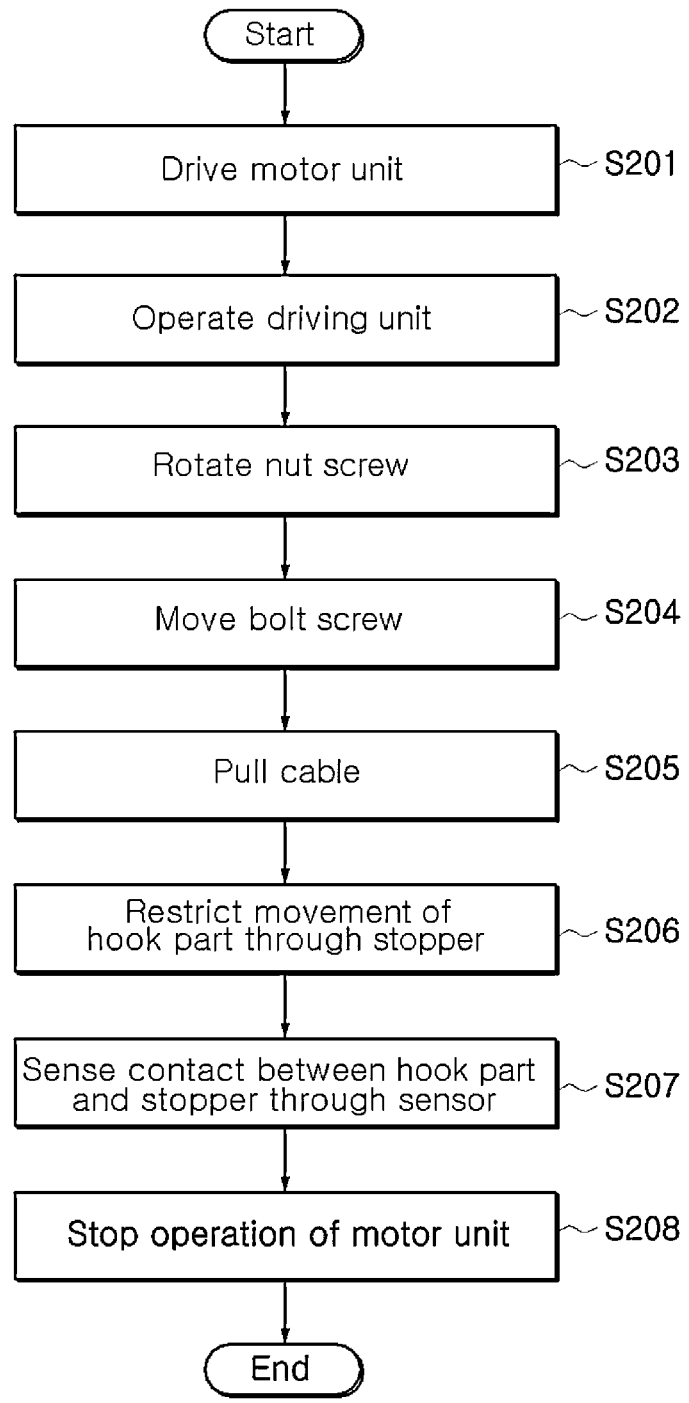
FIG. 13 is a flowchart illustrating the operation of the parking brake apparatus in accordance with the embodiment of the present invention.

FIG. 8 is a schematic perspective view of a parking brake apparatus in accordance with another embodiment of the present invention. FIG. 9 is an expanded view of a portion C in FIG. 8. FIG. 10 is a schematic cross-sectional view of a guide pipe in the parking brake apparatus in accordance with the embodiment of the present invention. FIG. 11 is a schematic cross-sectional view illustrating an operation of the parking brake apparatus in accordance with the embodiment of the present invention. FIG. 12 is an expanded view of a portion D in FIG. 11. FIG. 13 is a flowchart illustrating the operation of the parking brake apparatus in accordance with the embodiment of the present invention.

FIGS. 1 and 8 to 13 relate to another embodiment of the present invention. The parking brake apparatus in accordance with the embodiment of the present invention may further include sensors 92, 92a, and 92b configured to sense whether the hook part 80, the cable connection part 35, and the bolt screw 30 come in contact with the stopper 91, 91a, and 91b, respectively, unlike the parking brake apparatus described with reference to FIGS. 1 to 7. Thus, the embodiment described with reference to FIGS. 1 to 7 and the embodiment described with reference to FIGS. 1 and 8 to 13 are the same as or similar to each other, except for the sensors 92, 92a, and 92b. Thus, the following descriptions will be focused on the sensors 92, 92a, and 92b, in order to avoid the duplicated descriptions.

Referring to FIGS. 1 and 8 to 13, the parking brake apparatus in accordance with the embodiment of the present invention may include a housing 1, a motor unit 10, a driving unit 20, a bolt screw 30, a nut screw 40, a cable 50, a guide pipe 70, a hook part 80, and a boot part 90.

Referring to FIGS. 8 and 9, the boot part 90 may have a stopper 91 formed therein. When the hook guide 83 of the hook part 80 comes in contact with the stopper 91, the movement of the hook part 80 in the boot part 90 may be stopped by the stopper 91.

The stopper 91 may have a sensor 92 installed on a surface thereof, which comes in contact with the hook guide 83. The sensor 92 may sense whether the hook guide 83 pressurizes the stopper 91. When the hook guide 83 comes in contact with the stopper 91, the hook guide 83 cannot be moved any more. Thus, the motor unit 10, the driving unit 20, the bolt screw 30, the nut screw 40, and the cable 50 do not need to be operated or moved. In the present embodiment, the sensor 92 can sense the contact between the hook guide 83 and the stopper 91 in real time, and immediately transmit a sensed contact signal to the ECU 5. Thus, the ECU 5 may immediately stop the operation of the motor unit 10. Thus, in the present embodiment, an unnecessary operation of the motor unit 10 or the like may be stopped through the sensor 92 without a time loss.

The sensor 92 may sense whether the force of the hook guide 83 to pressurize the stopper 91 is equal to or more than a preset value (for example, 120 kgf). That is, the sensor 92 may not transmit a signal to the ECU 5 as soon as the hook guide 83 comes in contact with the stopper 91, but transmit a sensed contact signal to the ECU 5 only when the force of the hook guide 83 to pressurize the stopper 91 is equal to or more than the preset value. At this time, the preset value may be set to such a level that the bolt screw 30 and the nut screw 40 are not excessively tightened by the pressurizing force of the hook guide 83.

The sensor 92 may sense a force applied to the stopper 91, or convert a force applied to the stopper 91 into a current signal and sense whether a contact occurred, based on the current value. The current value may be set in the range of 8 to 12 A. Thus, when a current of 8 to 12 A is applied to the sensor 92, the sensor 92 may determine that a force of 120 kgf or more is applied to the stopper 91, and transmit a corresponding signal to the ECU 5. The ECU 5 may immediately stop the operation of the motor unit 10, based on the signal transmitted from the sensor 92.

Referring to FIGS. 8 and 9, the guide pipe 70 may include a stopper 91a installed at an inner surface adjacent to the nut screw 40. When the cable connection part 35 comes in contact with the stopper 91a, the movement of the cable connection part 35 in the guide pipe 70 may be stopped by the stopper 91a.

The stopper 91a may have the sensor 92a installed on a surface thereof, which comes in contact with the cable connection part 35. The sensor 92a may sense whether the cable connection part 35 pressurizes the stopper 91a. When the cable connection part 35 comes in contact with the stopper 91a, the cable connection part 35 cannot be moved any more. Thus, the motor unit 10, the driving unit 20, the bolt screw 30, the nut screw 40, and the cable 50 do not need to be operated or moved. In the present embodiment, the sensor 92a can sense the contact between the cable connection part 35 and the stopper 91a in real time, and immediately transmit the sensed contact signal to the ECU 5. Thus, the ECU 5 may immediately stop the operation of the motor unit 10. Thus, in the present embodiment, an unnecessary operation of the motor unit 10 or the like may be stopped through the sensor 92a without a time loss.

The sensor 92a may sense whether the force of the cable connection part 35 to pressurize the stopper 91a is equal to or more than a preset value (for example, 120 kgf). That is, the sensor 92a may not transmit a signal to the ECU 5 as soon as the cable connection part 35 comes in contact with the stopper 91a, but transmit a sensed contact signal to the ECU 5 only when the force of the cable connection part 35 to pressurize the stopper 91a is equal to or more than the preset value. At this time, the preset value may be set to such a level that the bolt screw 30 and the nut screw 40 are not excessively tightened by the pressurizing force of the cable connection part 35.

The sensor 92a may sense a force applied to the stopper 91a, or convert the force applied to the stopper 91 into a current signal and sense whether a contact occurred, based on the current value. The current value may be set in the range of 8 to 12 A. Thus, when a current of 8 to 12 A is applied to the sensor 92a, the sensor 92a may determine that a force of 120 kgf or more is applied to the stopper 91a, and transmit a corresponding signal to the ECU 5. The ECU 5 may immediately stop the operation of the motor unit 10, based on the signal transmitted from the sensor 92.

Referring to FIGS. 8 and 9, the stopper 91b may be installed on the inner surface of the housing 1, or specifically the inner surface of the bolt screw housing part 2. When the bolt screw 30 comes in contact with the stopper 91a, the movement of the bolt screw 30 in the bolt screw housing part 2 may be stopped by the stopper 91b.

The stopper 91b may have the sensor 92b installed on a surface thereof, which comes in contact with the bolt screw 30. The sensor 92b may sense whether the bolt screw 30 pressurizes the stopper 91b. When the bolt screw 30 comes in contact with the stopper 91b, the bolt screw 30 cannot be moved any more. Thus, the motor unit 10, the driving unit 20, the bolt screw 30, the nut screw 40, and the cable 50 do not need to be operated or moved. In the present embodiment, the sensor 92b can sense the contact between the bolt screw 30 and the stopper 91b in real time, and immediately transmit the sensed contact signal to the ECU 5. Thus, the ECU 5 may immediately stop the operation of the motor unit 10. Thus, in the present embodiment, an unnecessary operation of the motor unit 10 or the like may be stopped through the sensor 92b without a time loss.

The sensor 92b may sense whether the force of the bolt screw 30 to pressurize the stopper 91b is equal to or more than a preset value (for example, 120 kgf). That is, the sensor 92b may not transmit a signal to the ECU 5 as soon as the bolt screw 30 comes in contact with the stopper 91b, but transmit a sensed contact signal to the ECU 5 only when the force of the bolt screw 30 to pressurize the stopper 91 is equal to or more than the preset value. At this time, the preset value may be set to such a level that the bolt screw 30 and the nut screw 40 are not excessively tightened by the pressurizing force of the bolt screw 30.

The sensor 92b may sense a force applied to the stopper 91b, or convert a force applied to the stopper 91b into a current signal and sense whether a contact occurred, based on the current value. The current value may be set in the range of 8 to 12 B. Thus, when a current of 8 to 12 A is applied to the sensor 92b, the sensor 92b may determine that a force of 120 kgf or more is applied to the stopper 91b, and transmit a corresponding signal to the ECU 5. The ECU 5 may immediately stop the operation of the motor unit 10, based on the signal transmitted from the sensor 92b.

Referring to FIG. 13, the operation of the parking brake apparatus in accordance with the embodiment of the present invention will be described as follows.

When a driver manipulates a button, switch, or lever to operate the parking brake apparatus, the ECU 5 may drive the motor unit 10 at step S201.

The driving unit 20 may be operated by a rotational force generated by the motor unit 10 at step S202. The rotational force of the motor unit 10 may be transmitted to the worm gear 21 of the driving unit 20. The worm gear 21 may rotate the helical gear 22, and the helical gear 22 may rotate the nut screw 40, at step S203. While the nut screw 40 is rotated, the bolt screw 30 coupled to the nut screw 40 may be moved to the right at step S204.

The cable 50 may also be moved to the right by the movement of the bolt screw 30. Since the bolt screw 30 is linearly moved to the right in the nut screw 40, the cable 50 may be pulled to the right through the cable connection part 35 connected to the bolt screw 30 at step S205. At this time, the hook guide 83 of the hook part 80 may be moved to the right along the inside of the boot part 90 by the cable 50.

When the hook guide 83 is moved to the right and comes in contact with the stopper 91 of the boot part 90, the hook guide 83 may not be moved any more at step S206. That is, as the stopper 91 is arranged on the moving path of the hook guide 83, the movement of the hook guide 83 may be restricted by the stopper 91. During the contact between the cable connection part 35 and the stopper 91a or the contact between the bolt screw 30 and the stopper 91b in addition to the contact between the hook guide 83 and the stopper 91, the movement of the cable connection part 35 or the bolt screw 30 to the right may be stopped by the stopper 91a or 91b.

When the hook guide 83 comes in contact with the stopper 91 or pressurizes the stopper 91 at a force equal to or more than a preset value, the sensor 92 may sense the contact between the hook guide 83 and the stopper 91 in real time, at step S207. Alternatively, when the sensor 92a is installed, the sensor 92a may sense the contact between the cable connection part 35 and the stopper 91a in real time in case where the cable connection part 35 comes in contact with the stopper 91a or pressurizes the stopper 91a at a force equal to or more than the preset value. Furthermore, when the sensor 92b is installed, the sensor 92b may sense the contact between the bolt screw 30 and the stopper 91b in real time in case where the bolt screw 30 comes in contact with the stopper 91b or pressurizes the stopper 91b at a force equal to or more than the preset value.

When the hook guide 83 comes in contact with the stopper 91 or pressurizes the stopper 91 at a force equal to or more than the preset value, the cable connection part 35 comes in contact with the stopper 91a or pressurizes the stopper 91a at a force equal to or more than the preset value, or the bolt screw 30 comes in contact with the stopper 91b or pressurizes the stopper 91b at a force equal to or more than the preset value, the ECU 5 may stop the operation of the motor unit 10 based on the signal transmitted through the sensor 92, 92a, or 92b, at step S208.

As such, when the operation of the motor unit 10 is stopped at the time at which the operation of the motor unit 10 is not required any more, the bolt screw 30 and the nut screw 40 may be prevented from being excessively tightened to each other. Thus, it is possible to prevent a situation in which it is impossible to loosen the coupling between the bolt screw 30 and the nut screw 40. Therefore, it is possible to prevent a situation in which the braking force of the parking brake apparatus is not released because it is impossible to loosen the coupling between the bolt screw 30 and the nut screw 40.

In accordance with the embodiments of the present invention, the parking brake apparatus may prevent the bolt screw and the nut screw from being excessively tightened due to an increase in length of the cable.

Furthermore, the parking brake apparatus may prevent the bolt screw and the nut screw from being tightened more than necessary, thereby preventing a situation in which it is impossible to loosen the coupling between the bolt screw and the nut screw.

Furthermore, the parking brake apparatus may prevent the bolt screw and the nut screw from being tightened more than necessary, thereby preventing the worm gear from being damaged by an impact applied to the worm gear to rotate the nut screw.

Furthermore, the parking brake apparatus may prevent the motor unit from being unnecessarily driven, thereby suppressing unnecessary power consumption and extending the lifetimes of the respective parts.

Furthermore, the parking brake apparatus may sense the coupling state between the bolt screw and the nut screw, thereby preventing the bolt screw and the nut screw from being excessively tightened to each other.

Furthermore, the parking brake apparatus may prevent the hook part from colliding with the guide pipe through the stopper, prevent the cable connection part from colliding with the nut screw through the stopper, and prevent the bolt screw from colliding with the bolt screw housing part.

Although embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A parking brake apparatus comprising:
a nut screw rotatable about an axis;
a bolt screw engaged with the nut screw and configured to move in a longitudinal direction relative to the nut screw when the nut screw rotates;
a cable comprising a first end portion connected to the bolt screw and a second end portion;
a motor unit connected to the nut screw and configured to rotate the nut screw;
a hook connected to the second end portion of the cable;
a cable coupler disposed between and interconnecting the bolt screw and the cable, the cable coupler being movable in the longitudinal direction;
a guide pipe defining an internal space in which the cable coupler is disposed, and configured to guide the movement of the cable coupler such that the cable moves in the longitudinal direction; and
an elastic member installed between the cable coupler and a flange wall of the guide pipe and configured to block a collision between the cable coupler and the guide pipe.

2. The parking brake apparatus of claim 1, further comprising a boot part having an internal space in which the cable and the hook are moved in the longitudinal direction, and including a stopper arranged on a moving path of the hook so as to restrict the movement of the hook.

3. A parking brake apparatus comprising:
a motor unit;
a driving unit operated by the motor unit;
a nut screw rotated by the driving unit;
a bolt screw coupled to the nut screw so as to pass through the nut screw, and moved in a longitudinal direction inside the nut screw in connection with the rotation of the nut screw;
a cable having one side connected to the bolt screw;
a hook part connected to the other side of the cable; and
a boot part having an internal space in which the cable and the hook part are moved in the longitudinal direction, and including a stopper arranged on a moving path of the hook part so as to restrict the movement of the book part;
a cable connection part arranged between the bolt screw and the cable so as to connect the bolt screw and the cable; and
a guide pipe having an internal space in which the cable connection part is moved, and guiding a moving path of the cable connection part such that the cable is moved on the same axis as the bolt screw,
wherein the guide pipe comprises a pipe body formed in a hollow cylindrical shape, and having a guide groove formed on an inner surface thereof,
the cable connection part has a pin formed on an outer surface thereof so as to protrude outward, and
the pin is inserted into the guide groove, and moved along the guide groove when the cable connection part is moved.

4. A parking brake apparatus comprising:
a motor unit;
a driving unit operated by the motor unit;
a nut screw rotated by the driving unit;
a bolt screw coupled to the nut screw so as to pass through the nut screw, and moved in a longitudinal direction inside the nut screw in connection with the rotation of the nut screw;
a cable having one side connected to the bolt screw;
a hook part connected to the other side of the cable; and
a boot part having an internal space in which the cable and the hook part are moved in the longitudinal direction, and including a stopper arranged on a moving path of the hook part so as to restrict the movement of the hook part;
a cable connection part arranged between the bolt screw and the cable so as to connect the bolt screw and the cable; and
a guide pipe having an internal space in which the cable connection part is moved, and guiding a moving path of the cable connection part such that the cable is moved on the same axis as the bolt screw,
wherein the guide pipe has a stopper installed at an inner surface thereof adjacent to the nut screw, and the stopper of the guide pipe is arranged on the moving path of the cable connection part so as to restrict the movement of the cable connection part.

5. The parking brake apparatus of claim 4, further comprising an electronic control unit (ECU) configured to control the operation of the motor unit when the cable connection part comes in contact with the stopper of the guide pipe.

6. The parking brake apparatus of claim 5, wherein the stopper of the guide pipe comprises a sensor configured to sense whether the cable connection part comes in contact with the stopper of the guide pipe, and
the ECU is configured to stop the operation of the motor unit based on a contact signal transmitted from the sensor.

7. The parking brake apparatus of claim 2, further comprising an ECU configured to control the operation of the motor unit when the hook comes in contact with the stopper.

8. The parking brake apparatus of claim 7, wherein the stopper comprises a sensor configured to sense whether the hook comes in contact with the stopper, and
the ECU is configured to stop the operation of the motor unit based on a contact signal transmitted from the sensor.

9. The parking brake apparatus of claim 2, further comprising a housing surrounding the bolt screw and having a secondary stopper installed on an inner surface thereof,
wherein the secondary stopper is arranged on a moving path of the bolt screw so as to restrict the movement of the bolt screw.

10. The parking brake apparatus of claim 9, further comprising an ECU configured to control the operation of the motor unit when the bolt screw comes in contact with the secondary stopper.

11. The parking brake apparatus of claim 10, wherein the secondary stopper comprises a sensor configured to sense whether the bolt screw comes in contact with the secondary stopper, and
the ECU is configured to stop the operation of the motor unit based on a contact signal transmitted from the sensor.

12. The parking brake apparatus of claim 1,
wherein the guide pipe has a stopper installed at an inner surface thereof adjacent to the nut screw, and the stopper is arranged on the moving path of the cable coupler so as to restrict the movement of the cable coupler.

13. The parking brake apparatus of claim 12, further comprising an ECU configured to control the operation of the motor unit when the cable coupler comes in contact with the stopper.

14. The parking brake apparatus of claim 13, wherein the stopper comprises a sensor configured to sense whether the cable coupler comes in contact with the stopper, and
the ECU is configured to stop the operation of the motor unit based on a contact signal transmitted from the sensor.

15. The parking brake apparatus of claim 1,
a housing surrounding the bolt screw, and having a stopper installed on an inner surface thereof,
wherein the stopper is arranged on a moving path of the bolt screw so as to restrict the movement of the bolt screw.

16. The parking brake apparatus of claim 15, further comprising an ECU configured to control the operation of the motor unit when the bolt screw comes in contact with the stopper.

17. The parking brake apparatus of claim 16, wherein the stopper comprises a sensor configured to sense whether the bolt screw comes in contact with the stopper, and
the ECU is configured to stop the operation of the motor unit based on a contact signal transmitted from the sensor.

18. A control method of the parking brake apparatus of claim 2, comprising:
rotating the nut screw by the operation of the motor unit;
moving the bolt screw coupled to the nut screw through the rotation of the nut screw;
moving the cable connected to the bolt screw in the longitudinal direction through the movement of the bolt screw;
moving the hook connected to the cable through the movement of the cable such that the hook comes in contact with the stopper; and
stopping, by an ECU, the operation of the motor unit when the contact between the hook and the stopper is sensed.

19. The control method of claim 18 further comprising:
sensing whether the hook comes in contact with the stopper, through a sensor; and
wherein stopping the operation of the motor unit occurs upon receiving a contact signal between the hook and the stopper from the sensor.

* * * * *